(12) United States Patent
Detrez et al.

(10) Patent No.: US 6,410,475 B1
(45) Date of Patent: Jun. 25, 2002

(54) CATALYST INTENDED FOR THE POLYMERIZATION OF OLEFINS, PROCESS FOR ITS MANUFACTURE AND USE

(75) Inventors: Charles Detrez, Brussels; Benoit Koch, Hannut, both of (BE)

(73) Assignee: Solvay Polyolefins Europe-Belgium (Societe Anonyme), Brussels (BE)

( * ) Notice: Subject to any disclaimer, the term of this patent is extended or adjusted under 35 U.S.C. 154(b) by 0 days.

(21) Appl. No.: 09/412,594

(22) Filed: Oct. 5, 1999

(30) Foreign Application Priority Data

Oct. 5, 1998 (BE) ............................................ 09800719

(51) Int. Cl.[7] .......................... B01J 31/00; B01J 37/00; C08F 4/02; C08F 4/60
(52) U.S. Cl. ...................... 502/118; 502/110; 502/132; 502/154; 526/124.3; 526/124.5
(58) Field of Search .................. 502/110, 118, 502/132, 154; 526/124.3, 124.5

(56) References Cited

U.S. PATENT DOCUMENTS

| | | | | |
|---|---|---|---|---|
| 4,289,863 A | * | 9/1981 | Hill et al. | 502/154 |
| 4,364,842 A | * | 12/1982 | McDaniel et al. | 502/154 |
| 4,444,964 A | * | 4/1984 | McDaniel et al. | 502/152 |
| 4,444,968 A | * | 4/1984 | McDaniel et al. | 502/154 |
| 4,717,701 A | * | 1/1988 | McDaniel | 502/171 |
| 5,032,651 A | * | 7/1991 | McDaniel et al. | 502/154 |
| 5,246,900 A | * | 9/1993 | McDaniel et al. | 502/132 |
| 5,283,301 A | * | 2/1994 | McDaniel et al. | 502/132 |
| 5,849,852 A | | 12/1998 | Koch et al. | 502/154 |
| 6,320,004 B1 | * | 11/2001 | Luo | 502/154 |

FOREIGN PATENT DOCUMENTS

| | | |
|---|---|---|
| BE | A-1007148 | 4/1995 |
| BE | A-1008702 | 7/1996 |
| EP | 0 529 377 A | 3/1993 |
| EP | 0529377 | 2/1996 |
| WO | WO 91/07443 | 5/1991 |
| WO | WO 91/09881 | 7/1991 |
| WO | WO 94/00498 | 1/1994 |
| WO | WO 94/26791 | 11/1994 |
| WO | WO 95/35323 | 12/1995 |

* cited by examiner

Primary Examiner—Mark L. Bell
Assistant Examiner—J. Pasterczyk
(74) Attorney, Agent, or Firm—Venable; Marina V. Schneller

(57) ABSTRACT

The olefin polymerization catalyst comprises a supported transition metal, magnesium and halogen; the support comprises aluminum phosphate and at least one oxide of silica or alumina. The catalyst is formed by impregnating the support with a liquid complex formed by reacting a magnesium compound and a transition metal compound, which can contain either oxygen or halogen, and then precipitating the complex on the support with an organoaluminum compound which may be halogenated. The catalyst is used with an organometallic cocatalyst.

11 Claims, No Drawings

CATALYST INTENDED FOR THE POLYMERIZATION OF OLEFINS, PROCESS FOR ITS MANUFACTURE AND USE

The present invention relates to a catalyst and more particularly to a catalyst intended for the polymerization of olefins comprising a solid catalytic composition, based on a transition metal, magnesium and halogen, deposited on an inorganic support. It also relates to a process for the manufacture of such catalysts. Finally, it relates to the use of the said catalyst, in combination with a cocatalyst of the type of the organometallic compounds, in the polymerization and the copolymerization of olefins and in particular of ethylene.

The use is known, in the low pressure polymerization of olefins and in particular of ethylene, of catalytic systems comprising a catalyst comprising a transition metal, magnesium and halogen, (so-called Ziegler-Natta, catalysts) and a cocatalyst of the type of the organometallic compounds of metals from Groups 1, 2, 12, 13, and 14 the Periodic Table. These known catalytic systems have very major advantages, such as a very high activity and a very high productivity. They are extremely simple to prepare and their preparation does not result in any polluting byproduct. Finally, their morphology makes possible continuous suspension polymerization, with a very high relative content of polymer and thus a very low relative amount of diluent to be treated before recycling. However, the polymers obtained as particles directly with their involvement, although with a consistent particle size, have a relatively low mean size for the particles.

In Patent Application WO-A-91/07443, it is recommended to impregnate an inorganic support by means of a solution of magnesium halide in a monocarboxylic acid alkyl ester and then, after drying, to treat the support in this order with an organometallic compound of a metal from Groups 1–13 (typically an alkylaluminium or a silicone compound) and finally with a compound of a transition metal.

Patent Application WO-A-91/09881 discloses the impregnation of a porous support made of inorganic oxide by means of a solution in an inert solvent of the reaction product of a magnesium compound, of a titanium compound and of an aluminium compound, followed by the removal of the solvent and then by a chlorination stage.

Patent Application WO-A-94/00498 discloses the manufacture of a catalytic composition obtained by bringing a support made of inorganic oxide, having a low content of surface hydroxyl groups, into contact with an impregnating solution comprising a magnesium compound, an alcohol and a tetravalent titanium compound and the subsequent chlorination of the support.

Silicon and aluminium oxides (silica and alumina), their mixtures and other silicates, and chromium, titanium and zirconium oxides appear among the inorganic supports generally envisaged in these documents, silica being in all cases particularly preferred and specifically disclosed, generally a silica pretreated for the purpose of removing the surface hydroxyl groups. The supported catalytic solids disclosed in these documents result in an increased activity with regard to the polymerization of olefins.

Finally, the document WO-A-095/35323 recommends the impregnation of an inorganic support, such as and preferably silica, in this order, by means of an alkylaluminium chloride (chlorinating agent and internal cocatalyst), then by means of a magnesium compound and finally by means of a titanium compound comprising chlorine. This specific procedure is supposed to result in a catalytic solid with an activity independent of the amount of transfer agent employed in the polymerization.

It has now been found that solid catalytic compositions of Ziegler-Natta type deposited on silica do not exhibit an optimum response to hydrogen.

The object of the present invention is to provide catalysts exhibiting a particularly high response to hydrogen which can be used in the polymerization of olefins.

To this end, the invention relates to a catalyst intended for the polymerization of olefins comprising a solid catalytic composition, based on a transition metal, on magnesium and on halogen, deposited on an inorganic support, characterized in that the inorganic support comprises aluminium phosphate (A) and at least one inorganic oxide (B) chosen from silica and alumina.

The invention is based on the surprising observation that recourse to a support comprising aluminium phosphate and an inorganic oxide chosen from silica and alumina results in catalysts with a response to hydrogen markedly greater than that of a similar catalyst in which the support is silica alone.

The content in the support of each of its constituents can vary within a fairly wide range. According to an advantageous alternative form of the invention, the support comprises aluminium phosphate (A) and an inorganic oxide (B) chosen from silica and alumina in an (A):(B) molar percentage of (90 to 5):(10 to 95). The support preferably comprises aluminium phosphate (X), silica (Y) and alumina (Z) and more particularly still aluminium phosphate (X), silica (Y) and alumina (Z) in a molar percentage of (1 to 85):(10 to 95):(1 to 80).

Supports of this type and processes for manufacturing them are known and disclosed in Patent BE-A-1,007,148 on behalf of Solvay Polyolefins Europe—Belgium.

The supports employed in the invention generally exhibit a specific surface of 100 to 800 m$^2$/g, measured according to the volumetric BET method of British Standard 4359/1 (1984). The specific surface generally does not exceed 500 m$^2$/g. It is preferably from 150 to 400 m$^2$/g. Their crystallization temperature is preferably greater than 700° C. This temperature is determined by subjecting a sample of support to a heat treatment at different temperatures (500° C., 700° C., 800° C., 950° C, 1050° C.) and by subsequently examining this sample, after each heat treatment, by X-ray diffraction. The supports according to the invention generally exhibit a pore volume of approximately 0.5 to 4 cm$^3$/g. The pore volume is the sum of the pore volume composed of pores with a radius of less than or equal to 75 Å, measured according to the nitrogen penetration (BET) method according to the volumetric technique described in British Standard BS 4359/1 (1984), and of the pore volume measured by the mercury penetration method, by means of a porosimeter of Poro 2000 type sold by Carlo Erba Co., according to Belgian Standard B 05-202 (1976). The supports according to the invention preferably exhibit a pore volume of approximately 1 to 3 cm$^3$/g.

The support employed in the invention usually exhibits an apparent specific gravity of greater than or equal to 50 kg/m$^3$, in particular of greater than or equal to 100 kg/m$^3$; it is generally at most equal to 500 kg/m$^3$, typically to 300 kg/m$^3$. The apparent specific gravity is measured by free flow according to the following procedure: the powder of the support to be analysed is poured into a cylindrical receptacle with a capacity of 50 cm$^3$, the powder being left loose, from a hopper, the lower edge of which is positioned 20 mm above the upper edge of the receptacle. The receptacle, filled with the powder, is subsequently weighed, the tare is deducted from the weight found and the result obtained (expressed in g) is divided by 50.

The supports employed in the invention are generally provided in the powder form, the grains of the powder having a diameter of 10 to 250 μm, generally of 25 to 150 μm. It is advantageous to subject them to a heat treatment before proceeding to the deposition of the catalytic composition. This heat treatment is generally carried out at a temperature at least equal to 150° C. and which, furthermore, does not exceed 1000° C. The heat treatment is generally carried out at a temperature at least equal to 250° C. and which does not exceed 875° C. The duration of the heat treatment usually amounts to 2 hours at least and generally does not exceed 18 hours.

The catalyst according to the invention (composed of the solid catalytic composition and of the inorganic support) generally comprises, per kg, at least 2 g of transition metal. The content of transition metal in the catalyst usually does not exceed 100 g per kg of catalyst. The content of transition metal is generally at least 5 g and, furthermore, not more than 60 g per kg of catalyst.

According to the invention, the catalyst comprises a solid catalytic composition, based on a transition metal, on magnesium and on halogen, deposited on an inorganic support as defined above. The catalysts according to the invention can be obtained by any known preparation process employing, separately or as a mixture and in any order, a magnesium compound, a transition metal compound and an optionally halogenated organoaluminium compound, as well as an inorganic support, and in particular by the processes disclosed in the prior art cited above.

The solid catalytic compositions deposited on a support according to the invention advantageously result from the reaction, in a first stage, of at least one magnesium compound with at least one compound of a transition metal, until a liquid complex is obtained, and, in a subsequent stage, from the treatment of the liquid complex by means of an optionally halogenated organoaluminium compound, in order to collect a solid catalytic composition. Solid catalytic compositions of this type are known as such and are disclosed, for example, in Patent BE-A- 1,008,702 on behalf of Solvay Polyolefins Europe—Belgium.

The magnesium compound is chosen from organic oxygen-comprising compounds and halogen-comprising compounds of magnesium. The term "organic oxygen-comprising compound of magnesium" is understood to denote any compound in which an organic radical is bonded to magnesium via oxygen, that is to say any compound comprising at least one sequence of magnesium-oxygen-organic radical bonds per magnesium atom. The organic radicals bonded to magnesium via oxygen are generally chosen from radicals comprising up to 20 carbon atoms and more particularly from those comprising up to 10 carbon atoms. Good results are obtained when these radicals comprise from 2 to 6 carbon atoms. These radicals can be saturated or unsaturated, with a branched chain or with a straight or cyclic chain. They are preferably chosen from hydrocarbon-comprising radicals and in particular from alkyl (linear or branched), alkenyl, aryl, cycloalkyl, arylalkyl and acyl radicals and their substituted derivatives.

The organic oxygen-comprising compounds of magnesium can, in addition to the organic radicals bonded to magnesium via oxygen, comprise other radicals, such as, for example, the —OH, —$(SO_4)_{1/2}$, —$NO_3$, —$(PO_4)_{1/3}$, —$(CO_3)_{1/2}$ and —$ClO_4$ radicals. They can also be organic radicals bonded directly to magnesium via carbon.

Mention may be made, among organic oxygen-comprising compounds of magnesium which can be used, of alkoxides (such as ethoxide and cyclohexanoate), alkylalkoxides (such as ethylethoxide), hydroxyalkoxides (such as hydroxymethoxide), phenoxides (such as naphthenate), or optionally hydrated carboxylates (such as acetate and benzoate). They can also be organic nitrogen-comprising oxygen-comprising compounds, that is to say compounds comprising sequences of magnesium-oxygen-nitrogen-organic radical bonds (such as oximates, in particular butyl oximate, or salts of hydroxylamine acids, in particular the derivative of N-nitroso-N-phenylhydroxylamine), chelates, that is to say organic oxygen-comprising compounds in which the magnesium has at least one sequence of normal bonds of the magnesium-oxygen-organic radical type and at least one coordination bond, so as to form a heterocycle in which the magnesium is included (such as enolates, in particular acetylacetonate), or silanolates, that is to say compounds comprising sequences of magnesium-oxygen-silicon-hydrocarbon-comprising radical bonds (such as triphenylsilanolate). Mention may also be made, as examples of organic oxygen-comprising compounds of magnesium, of those comprising several different organic radicals (such as magnesium methoxyethoxide), complex alkoxides and phenoxides of magnesium and of another metal (such as $Mg[Al(OR)_4]_2$) and mixtures of two or more of the organic oxygen-comprising compounds of magnesium defined above.

The term "halogen-comprising compound of magnesium" is understood to denote any compound comprising at least one magnesium-halogen bond. The halogen can be fluorine, chlorine, bromine or iodine. The halogen is preferably chlorine.

Mention may be made, among halogen-comprising compounds of magnesium, of dihalides, preferably comprising at most one water molecule per dihalide molecule, complexed dihalides (such as $MgCl_2.6NH_3$ or $MgCl_2.6CH_3OH$) or compounds comprising, in addition to the magnesium-halogen bond, an organic radical bonded to magnesium via oxygen (such as $Mg(OH)Cl$ or $Mg(O—CH_3)Cl$). They can also be compounds comprising, in addition to the magnesium-halogen bond, a magnesium-organic radical bond (such as $Mg(C_2H_5)Cl$), products from the hydrolysis of hydrated magnesium halides, provided that these products still comprise magnesium-halogen bonds, mixed compositions comprising halogen-comprising and oxygen-comprising compounds of magnesium (such as $MgCl_2.MgO.H_2O$) and mixtures of two or more of the halogen-comprising compounds of magnesium defined above.

Use is preferably made, among all the magnesium compounds which are suitable, of those which only comprise magnesium-oxygen-organic radical bonds and/or magnesium-halogen bonds per magnesium atom, to the exclusion of any other bond. The best results are obtained with organic oxygen-comprising compounds, particularly with those comprising only magnesium-oxygen-organic radical bonds per magnesium atom. Magnesium alkoxides are particularly preferred. The best results are obtained with magnesium dialkoxides, in particular magnesium diethoxide.

The compound of a transition metal is chosen from organic oxygen-comprising compounds and halogen-comprising compounds of the transition metal.

The term "organic oxygen-comprising compound of a transition metal" is understood to denote any compound in which an organic radical is bonded to the transition metal via oxygen, that is to say any compound comprising at least one sequence of transition metal-oxygen-organic radical bonds per transition metal atom. The organic radicals are in accordance with those defined above for the organic oxygen-comprising compounds of magnesium.

The transition metal is generally chosen from transition metals front Group 4 or 5 of the Periodic Table.

The transition metal is advantageously chosen from titanium, zirconium, hafnium and vanadium. Titanium and zirconium and their mixtures are highly suitable. Titanium is particularly preferred. In the case of titanium, zirconium or hafnium, use is preferably made of tetravalent transition metal compounds, because they are generally liquid and, in any case, generally soluble and with better solubility than those in which the transition metal has a valency of less than 4. The organic oxygen-comprising compounds of a transition metal which can be used can also comprise transition metal-oxygen-transition metal bonds.

The organic oxygen-comprising compounds of a transition metal can be represented by the general formula $MO_x(OR')_{m-2x}$, in which M represents the transition metal of valency m, R' represents an organic radical as defined above and x is a number such that $0<x \leq (m-1)/2$. Use is preferably made of compounds in which x is such that $0 \leq x \leq (m-2)/2$.

It is obvious that the organic oxygen-comprising compounds of a transition metal can comprise several different organic radicals.

Mention may be made, among organic oxygen-comprising compounds of a transition metal, of alkoxides (such as $Ti(O-n-C_4H_9)_4$), phenoxides (such as $Zr(OC_6H_5)_4$), oxyalkoxides (such as $HfO(OC_2H_5)_2$), condensed alkoxides (such as $Ti_2O(O-i-C_3H_7)_6$), carboxylates (such as $Zr(OOCCH_3)_4$) and enolates (such as hafnium acetylacetonate).

The term "halogen-comprising compound of a transition metal" is understood to denote any compound comprising at least one transition metal-halogen bond. The halogen is in accordance with that defined above for the halogen-comprising compounds of magnesium. Preference is given to chlorine.

Mention may be made, among halogen-comprising compounds of a transition metal, of halides, in particular tetrahalides (such as $TiCl_4$), complex halides (such as $ZrCl_4 \cdot 6NH_3$), complex halides of a transition metal and of an alkali metal (such as $Na_2TiCl_6$), oxyhalides (such as $HfOCl_2$) and haloalkoxides (such as $Ti(OC_2H_5)_2Cl_2$ or $Zr(O-i-C_3H_7)_3Cl$). It is obvious that several transition metal compounds can be used simultaneously. When it is desired to obtain a polyolefin exhibiting a broad distribution of molecular masses, it may prove preferable to use compounds of different transition metals, in particular a titanium compound and a zirconium compound.

Use is preferably made, among all the compounds of a transition metal which are suitable, of those which only comprise transition metal-oxygen-organic radical bonds and/or transition metal-halogen bonds per transition metal atom, to the exclusion of any other bond. The best results are obtained with organic oxygen-comprising compounds of a transition metal, in particular with those comprising only transition metal-oxygen-organic radical bonds per transition metal atom. Alkoxides are highly suitable. The best results are obtained with titanium or zirconium tetraalkoxides, in particular titanium or zirconium tetrabutoxide.

Of course, several different magnesium compounds can be employed simultaneously. Likewise, several different compounds of a transition metal or several compounds for which the transition metal is different can also be employed simultaneously. The reaction of the first stage can be carried out by any appropriate known method, provided that it makes it possible to produce a complex in the liquid state.

When the magnesium compound and/or the compound of a transition metal are liquid under the operating conditions of the reaction, it is desirable to carry out the reaction by simple mixing of these reactants in the absence of solvent or diluent. However, the reaction can be carried out in the presence of a diluent when the amount of liquid present in the reaction mixture is insufficient to bring the reaction to completion or when the two reactants are solid under the operating conditions of the reaction.

The optionally halogenated organoaluminium compound is chosen from organoaluminium compounds corresponding to the general formula $AlR_nX_{3-n}$, in which R is a hydrocarbon-comprising radical, X is a halogen and n is less than or equal to 3.

The optionally halogenated organoaluminium compound advantageously corresponds to the formula $AlR_nX_{3-n}$, in which R is a hydrocarbon-comprising radical comprising up to 20 carbon atoms, X is halogen and n is less than or equal to 3. The radical preferably comprises up to 6 carbon atoms. Good results are obtained when R is an alkyl (linear or branched), cycloalkyl, arylalkyl, aryl and alkylaryl radical. The best results are obtained when R represents a linear or branched alkyl radical. X is generally chosen from fluorine, chlorine, bromine and iodine. Chlorine is particularly highly suitable. Preferably, n does not exceed 1.5, more especially does not exceed 1. Mention may be made, as examples of non-halogenated organoaluminium compounds, of triethylaluminium and triisobutylaluminium. Mention may be made, as examples of halogenated organoaluminium compounds which can be used in the invention, of aluminium trichloride [$AlCl_3$], ethylaluminium dichloride [$Al(C_2H_5)Cl_2$], ethylaluminium sesquichloride [$Al_2(C_2H_5)_3Cl_3$] and diethylaluminium chloride [$Al(C_2H_5)_2Cl$]. Ethylaluminium dichloride or isobutylaluminium dichloride is preferred.

The invention also relates to a process for the manufacture of the catalyst according to the invention. This process is characterized in that, in a first stage, at least one magnesium compound is reacted with at least one transition metal compound in order to form a liquid complex and the inorganic support is impregnated by means of the said liquid complex and, in a subsequent stage, the said liquid complex is precipitated on the support by means of an optionally halogenated organoaluminium compound, in order to collect a catalyst.

The transition metal, magnesium and optionally halogenated organoaluminium compounds employed in the process for the manufacture of the catalyst according to the invention are those defined above with respect to the method for producing the solid catalytic composition.

The amount of the compound of a transition metal employed is defined with respect to the amount of the magnesium compound employed. It can vary within a wide range. It is generally at least 0.01 mol of transition metal present in the transition metal compound per mole of magnesium present in the magnesium compound, in particular at least 0.02 mol, values of at least 0.05 being the preferred values. The amount is usually at most 20 mol of transition metal present in the compound of a transition metal per mole of magnesium present in the magnesium compound, more specifically at most 10 mol, values of at most 5 mol being recommended.

The temperature at which the magnesium compound and the compound of a transition metal are brought together in the first stage of the preparation of the catalyst depends on the nature of the reactants and is preferably less than the decomposition temperature of the reactants and of the liquid complex obtained following the reaction. It is generally at least −20° C., in particular at least 0° C., temperatures of at least 20° C. being the most usual. The temperature is usually at most 200° C., more especially at most 180° C., temperatures of at most 150° C. being advantageous, for example of approximately 140° C.

The duration of the first stage depends on the nature of the reactants and on the operating conditions and is advantageously sufficiently long to produce complete reaction between the reactants. The duration can generally vary from 10 minutes to 20 hours, more specifically from 2 to 15 hours, for example from 4 to 10 hours.

The pressure under which the reaction of the first stage is carried out and the rate of addition of the reactants are not critical factors. For reasons of convenience, the reaction is generally carried out at atmospheric pressure; the rate of addition is generally chosen so as not to bring about sudden heating of the reaction mixture due to a possible self-acceleration of the reaction. The reaction mixture is generally stirred, so as to promote its homogenization, for the duration of the reaction. The reaction can be carried out continuously or batchwise.

On conclusion of the first stage of the preparation of the catalyst, a liquid complex of the magnesium compound and of the compound of a transition metal is collected, which complex can be employed as is in the subsequent stage of impregnation of the inorganic support or can optionally be stored in a diluent, preferably an inert diluent, in order to recover it intact subsequently and to employ it in the presence of the diluent. The diluent is generally chosen from aliphatic or cycloaliphatic hydrocarbons preferably comprising up to 20 carbon atoms, such as, for example, alkanes, such as isobutane, pentane, hexane, heptane or cyclohexane or their mixtures. Hexane is particularly highly suitable.

The impregnation of the inorganic support by means of the liquid complex can be carried out in any appropriate manner. It is usually carried out at a temperature at least equal to −10° C. and which, furthermore, does not exceed 150° C. The temperature of the impregnation generally amounts to 20° C. at least and does not exceed 100° C. Excellent results are obtained with impregnating temperatures ranging from 25 to 60° C. The duration and the pressure at which the impregnation is carried out do not constitute critical parameters. The impregnation is generally carried out at atmospheric pressure.

The amount of liquid complex impregnated in the inorganic support is chosen so that the catalyst ultimately comprises at least 2 g and furthermore not more than 100 g of transition metal per kg and preferably at least 5 kg and not more than 60 g of transition metal per kg of catalyst.

According to a first alternative form of the process for manufacturing the catalyst, the inorganic support impregnated by means of the liquid complex is dried before bringing it into contact with the optionally halogenated organoaluminium compound. The drying is advantageously carried out under flushing with nitrogen at a temperature at least equal to 20° C. and which, furthermore, does not exceed 150° C. The drying generally takes place at a temperature of at least 40° C. and which does not exceed 100° C. The drying is regarded as being finished when the impregnated support exhibits a flowability similar to that of the support before impregnation. According to a second, particularly preferred, alternative form, the inorganic support impregnated with the liquid complex is brought directly into contact with the optionally halogenated organoaluminium compound.

This alternative form exhibits the advantage of being particularly simple (no intermediate stage of drying of the support impregnated with the liquid complex) and of resulting in catalysts exhibiting a markedly improved response to hydrogen.

The preparation of the solid catalytic composition comprises a subsequent stage which is known as the precipitation stage and which has the function of reducing the valency of the transition metal and simultaneously of halogenating, if appropriate, the magnesium compound and/or the transition metal compound, that is to say of substituting the alkoxy groups present in the magnesium compound and/or in the transition metal compound by halogens, so that the liquid complex obtained in the first stage is precipitated as a solid catalytic composition.

The treatment by means of the optionally halogenated organoaluminium compound in the subsequent stage of precipitation of the catalytic composition on the inorganic support can be carried out by any appropriate known means and preferably by gradually adding the optionally halogenated organoaluminium compound to the inorganic support impregnated with the liquid complex resulting from the first stage.

The amount of optionally halogenated organoaluminium compound to be employed depends on the amounts of the magnesium compound and of the compound of a transition metal employed and is advantageously sufficient to produce the desired degree of reduction and, if appropriate, the desired degree of halogenation. In practice, it is not advantageous to employ an amount greater than the minimum amount necessary to obtain complete reduction and, if appropriate, complete halogenation as any excess employed results in an increase in the content of aluminium in the catalyst, which is undesirable. The amount is generally at least 0.5 mol of aluminium per mole of transition metal employed, preferably at least 1 mol, values of at least 2 mol being the most usual; the amount is commonly at most 50 mol of aluminium per mole of transition metal employed, in particular at most 30 mol, values of at most 20 mol being advantageous.

The temperature at which the stage of precipitation of the liquid complex is carried out is advantageously less than the boiling temperature, at ordinary pressure, of the optionally halogenated organoaluminium compound. It is usually at least −20° C., more particularly at least 0° C., temperatures of at least 20° C. being recommended. The temperature generally does not exceed 150° C., more especially does not exceed 100° C., temperatures of at most 80° C. being the most usual.

The duration of the stage of precipitation of the liquid complex is preferably sufficient to produce complete precipitation. It can vary from 1 minute to 10 hours, more specifically from 10 minutes to 8 hours, for example from 0.5 to 5 hours.

The pressure under which the stage of precipitation of the liquid complex is carried out is not a critical factor. For reasons of convenience, the operation is generally carried out at atmospheric pressure. The rate of addition of the reactants is generally chosen so as not to bring about sudden heating of the reaction mixture due to a possible self-acceleration of the reaction. The reaction mixture is generally stirred, so as to promote its homogenization, for the duration of the reaction. The reaction can be carried out continuously or batchwise.

On conclusion of the stage of precipitation of the liquid complex by means of the optionally halogenated organoaluminium compound, a catalyst is collected which is composed of a homogeneous precipitate (the constituents being coprecipitated from a liquid complex), on an inorganic support, of an essentially amorphous mixture of a Magnesium halide, of a halide of the transition metal and, possibly, of partially reduced and/or partially halogenated compounds, as well as optionally of an electron donor. They are chemically bonded complexes, produced from chemical reactions, and not the result of mixtures or of adsorption phenomena. This is because it is impossible to dissociate one or other of the constituents of these complexes by using purely physical separation methods.

The stage of precipitation of the liquid complex can advantageously be followed by a maturing treatment, the function of which is to continue the precipitation reaction and to make it possible to obtain a catalyst having improved resistance to ageing. The maturing is carried out at a temperature generally equivalent to or greater than that at which the precipitation takes place. It is carried out for a noncritical duration generally ranging from 5 minutes to 12 hours, preferably for at least 0.5 hour.

The catalysts according to the invention are particularly suited to the polymerization of olefins. The invention also relates to the use of these catalysts, in combination with a cocatalyts in combination with a cocatalyst chosen from organometallic compounds of a metal from Groups 1, 2, 12, 13, and 14, in the polymerization of olefins.

The organometallic compound which serves as activator of the catalyst and which is commonly known as "cocatalyst." can be chosen from organometallic compounds of lithium, magnesium, zinc, aluminium or tin. The best results are obtained with organoaluminium compounds.

Use may be made, as organometallic compound, of totally alkylated compounds with straight or branched alkyl chains comprising up to 20 carbon atoms, such as, for example, n-butyllithium, diethylmagnesium, diethylzinc, tetraethyltin, tetrabutyltin and trialkylaluminiums. Use may also be made of alkylmetal hydrides in which the alkyl radicals also comprise up to 20 carbon atoms, such as diisobutylaluminium hydride and trimethyltin hydride. Alkylmetal halides in which the alkyl radicals also comprise up to 20 carbon atoms, such as ethylaluminium sesquichloride, diethylaluminium chloride and diisobutylaluminium chloride, are also suitable. Use may also be made of organoaluminium compounds obtained by reacting trialkylaluminiums or dialkylaluminium hydrides, the radicals of which comprise up to 20 carbon atoms, with diolefins comprising from 4 to 20 carbon atoms and more particularly the compounds known as isoprenylaluminiums.

Preference is generally given to trialkylaluminiums and in particular to those with straight alkyl chains comprising up to 18 carbon atoms, more particularly from 2 to 8 carbon atoms. Triethylaluminium and triisobutylaluminium are preferred.

The total amount of organometallic compound employed in the polymerization process of the invention can vary within a wide range. It is generally from 0.02 to 50 mmol per liter of solvent, of diluent or of reactor volume and preferably from 0.2 to 2.5 mmol per 1.

The amount of catalyst employed in the polymerization process of the invention is determined as a function of the content of transition metal in the said complex. It is generally chosen so that the concentration is from 0.001 to 2.5 and preferably from 0.01 to 0.25 mmol of transition metal per liter of solvent, of diluent or of reactor volume.

The molar ratio of the total amount of the metal present in the organometallic compound to the total amount of the transition metal present in the compound of a transition metal is usually at least 1, in particular at least 5, values of at least 10 being advantageous. The ratio is generally at most 100, preferably at most 75, values of at most 50 being recommended.

The polymerization process of the invention can be carried out according to any known process, in solution in a solvent, which can be the olefin itself in the liquid state, or in suspension in a hydrocarbon-comprising diluent, or alternatively in the gas phase. Good results are obtained in suspension and gas phase polymerizations.

The polymerization is carried out by bringing the olefin into contact with the catalytic system comprising the catalyst, the organometallic compound and, if appropriate, an electron donor. The latter can optionally be employed in the step of the manufacture of the catalyst, for example after the formation of the liquid complex and before or after the precipitation stage, or alternatively in the polymerization step.

The olefin which is polymerized can be chosen from olefins comprising from 2 to 20 carbon atoms and preferably from 2 to 6 carbon atoms, such as ethylene, propylene, 1-butene, 4-methyl-1-pentene and 1-hexene. Ethylene, 1-butene and 1-hexene are highly suitable. Ethylene is particularly preferred. Of course, several different olefins can be employed simultaneously in order to obtain copolymers, for example mixtures of two of the abovementioned olefins or of one or more of these olefins with one or more diolefins comprising from 4 to 20 carbon atoms, preferably. These diolefins can be non-conjugated aliphatic diolefins, such as 1,4-hexadiene, monocyclic diolefins, such as 4-vinylcyclohexene, 1,3-divinyl-cyclohexane, cyclopentadiene or 1,5-cyclooctadiene, or alicyclic diolefins having an endocyclic bridge, such as dicyclopentadiene or norbornadiene, and conjugated aliphatic diolefins, such as butadiene and isoprene.

The process according to the invention applies particularly well to the manufacture of ethylene homopolymers and of copolymers comprising at least 90 mol % of ethylene and preferably 95 mol % of ethylene and in particular of random co- and terpolymers of ethylene and of butene and/or of hexene or alternatively of copolymers with a bimodal distribution of the molecular masses obtained by sequential polymerization of mixtures of ethylene and of butene and/or of hexene.

The examples which follow are intended to illustrate the invention.

Examples 1 and 3 are in accordance with the invention. In Example 1, a catalyst composed of a solid catalytic composition, comprising magnesium, titanium and chlorine, deposited on an inorganic support according to the invention, the said catalyst being obtained according to the process disclosed in Patent Application WO-A-91/07443, was manufactured and employed in the homopolymerization of ethylene. In Comparative Example 2, a catalyst identical to that of Example 1, except that the support was replaced by silica, was manufactured and employed in the homopolymerization of ethylene under conditions identical to those of Example 1. In Example 3, a catalyst composed of a solid catalytic composition, comprising magnesium, titanium and chlorine, deposited on an inorganic support according to the invention, the catalyst being obtained according to the process claimed in the present application, was manufactured and employed in the homopolymerization of ethylene.

EXAMPLE 1

1.1 Preparation of the catalyst 3 g of anhydrous $MgCl_2$ are dissolved in approximately 135 ml of ethyl acetate. The solution obtained is introduced into a 250 ml reactor already containing 10 g of inorganic support with a composition $Al(PO_4)_3:SiO_2:Al_2O_3$ in a molar percentage of 33:33:33. This support, which was subjected to a heat pretreatment at 800° C. for 16 h, exhibits a mean diameter of the particles of 129 μm, a specific surface of 267 cm²/g and a pore volume of 2.11 cm³/g (BET measurements). The support is suspended with stirring. The temperature is brought to 80° C. and maintained for 5 h. The solvent is subsequently evaporated under a nitrogen stream, still at 80° C.

The impregnated support is resuspended in fresh hexane. 82 ml of a 10% by weight solution of triethylaluminium in hexane are subsequently introduced into the suspension. The temperature is brought to 40° C. and maintained for one hour. The treated support is washed twice with fresh hexane.

A solution composed of 80 ml of hexane and 1.2 ml of $TiCl_4$ is subsequently introduced into the suspension. The temperature is brought to 50° C. and maintained for 2 hours. The impregnated support is finally dried under a nitrogen stream at 100° C.

The solid catalyst collected exhibits the following composition, expressed in g/kg: Ti 22, Mg 52, Cl 212.

1.2 Polymerization 1 l of hexane is introduced into a 3 l reactor conditioned beforehand under nitrogen. 2 mmol of triethylaluminium, in solution in hexane in a proportion of 40 g/l, are introduced into the reactor, still under nitrogen protection. The reactor is closed, stirring is begun and the reactor is brought to 85° C. Hydrogen, at a partial pressure of 2.5 bar, and ethylene, at a partial pressure of 6 bar, are successively introduced at this temperature via the headspace. The total pressure amounts to 9bar.

When the temperature and the pressure have equilibrated, 60 mg of the catalyst obtained in 1.1 are introduced by excess pressure from a lock chamber. The polymerization begins and is continued for 73 minutes.

The reactor is cooled and degassed and the suspension of polymer in hexane is recovered as is. After evaporation of the hexane, 443 g of polymer are collected, which corresponds to an activity of 1010 g PE/g catalyst.hour.bar of ethylene. The main properties of the polymer are as follows:

| MI2* | 2.6 g/10 min |
| --- | --- |
| Loose apparent specific gravity | 277 kg/m³ |
| Mean diameter of the particles | 902 μm |
| Fraction of particles of less than 125 μm | 3.3% |

EXAMPLE 2 (Comparative)

2.1 Preparation of the catalyst

The procedure of Example 1.1 is repeated, except that the inorganic support with a composition $Al(PO_4)_3:SiO_2:Al_2O_3$ is replaced by a silica pretreated thermally at 815° C. for 16 h. The silica employed has a mean diameter of the particles of 30 μm, a specific surface of 310 cm²/g and a pore volume of 1.56 cm³/g (BET measurements).

The catalytic solid collected has the following composition, expressed in g/kg: Ti 27, Mg 44, Cl 207.

2.2 Polymerization 81 mg of the above catalytic solid are employed in the polymerization under conditions identical to those described in 1.2. The polymerization duration is 95 minutes this time. 332 g of polymer are collected, which corresponds to an activity of 431 g PE/g catalyst.hour.bar of ethylene. The main properties of the polymer are as follows:

| MI2* | 1.2 g/10 min |
| --- | --- |
| Loose apparent specific gravity | 301 kg/m³ |
| Mean diameter of the particles | 605 μm |
| Fraction of particles of less than 125 μm | 1.1% |

EXAMPLE 3

3.1 Preparation of the catalyst 13.0 ml of a homogeneous mixture of Mg diethoxide and of Ti tetrabutoxide (Ti/Mg molar ratio of 0.4), diluted in hexane in a proportion of 1.14 mol of Mg per liter, are introduced into a 1 l glass reactor. The homogeneous mixture of Mg diethoxide and of Ti tetrabutoxide was prepared beforehand by heating at 140° C. with stirring for 5 h.

The homogeneous solution is stirred. An additional amount of hexane is added in order to bring the total volume to approximately 110 ml. 17.7 g of inorganic support, with a composition $Al(PO_4)_3:SiO_2:Al_2O_3$ identical to that employed in Example 1, are subsequently added.

The temperature of the suspension is brought to 35° C. 30 ml of a solution of 0.0349 mol of dichloroethylaluminium in hexane are introduced, at a constant flow rate, over a duration of 2 h, the temperature being maintained at 35° C. The Al/Mg molar ratio thus employed is 2.35.

After the introduction, the suspended solid is washed 6 times with fresh hexane, by successive separations by settling/extractions, with a dilution ratio during the washing operations of at least 2.

The solid is washed and dried under nitrogen at 80° C. The solid catalyst collected exhibits the following composition, expressed in g/kg: Ti 9.3, Mg 9.8, Cl 61.

3.2 Polymerization of ethylene 345 mg of solid catalyst obtained in 3.1 are employed in the polymerization of ethylene under conditions identical to those described in 1.2. The duration of the polymerization was 62 minutes. 443 g of polymer are collected, which corresponds to an activity of 160 g PE/g catalyst.hour.bar of ethylene. The main properties of the polymer are as follows:

| MI2* | 6.9 g/10 min |
| --- | --- |
| Loose apparent specific gravity | 346 kg/m³ |
| Mean diameter of the particles | 638 μm |
| Fraction of particles of less than 125 μm | 9.9% |

MI2* = melt flow index of a polyolefin denoting the flow rate of the molten polyolefin at 190° C., which flows through a die with a diameter of 2 mm and with a length of 8 mm, under the action of a weighted piston with a mass of 2.16 kg, this flow rate being expressed in g/10 min, according to ASTM Standard D 1238 (1990).

What is claimed is:

1. A solid catalytic composition, comprising a transition metal selected from the group consisting of Group 4B and 5B metals of the Periodic Table; magnesium and halogen, deposited on an inorganic support, characterized in that the inorganic support comprises aluminum phosphate (A) and at least one inorganic oxide (B) selected from the group consisting of silica and alumina.

2. Catalyst according to claim 1, characterized in that the support comprises aluminum phosphate (A) and an inorganic oxide (B) selected from the group consisting of silica and alumina in an (A):(B) molar ratio of (90 to 5):(10 to 95).

3. Catalyst according to claim 1, characterized in that the support comprises aluminum phosphate (X), silica (Y) and alumina (Z) in an (X):(Y):(Z) molar ratio of (1 to 85):(10 to 95):(1 to 80).

4. Catalyst according to claim 1, characterized in that it comprises at least 2 g and not more than 100 g of transition metal per kg.

5. Catalyst according to claim 1, characterized in that the transition metal is titanium, zirconium, or mixtures thereof.

6. Process for the manufacture of a catalyst according to claim 1, characterized in that, in a first stage, at least one magnesium compound is reacted with at least one transition metal compound in order to form a liquid complex and the inorganic support is impregnated by means of the said liquid complex and, in a subsequent stage, the said liquid complex is precipitated on the support by means of an optionally halogenated organoaluminium compound, in order to obtain a catalyst.

7. Process according to claim 6, characterized in that the magnesium compound is selected from the group consisting of organic compounds and halogen-containing compounds of magnesium; the transition metal is selected from the group consisting of organic compounds and halogen-containing compounds of a transition metal from Group 4 or 5 of the Periodic Table; and the optionally halogenated organoaluminium compound from the compounds of formula $AlR_nX_{3-n}$ in which R is a hydrocarbonyl radical containing up to 20 carbon atoms, X is halogen and n is less than or equal to 3.

8. Process according to claim 7,
wherein the magnesium compound is selected from the group consisting of alkoxides, alkylalkoxides, hydroxyalkoxides, phenoxides, optionally hydrated carboxylates and halides;

wherein the transition metal compound is selected from the group consisting of alkoxides, alkylalkoxides, hydroxyalkoxides, phenoxides, optionally hydrated carboxylates and halides; and wherein the optionally halogenated organoaluminium compound is selected from the group consisting of chlorinated organoaluminium compounds of formula $AlR_nX_{3-n}$ in which R is a hydrocarbyl containing up to 6 carbon atoms and n does not exceed 1.5.

9. Process for the manufacture of a catalyst according to claim 8, characterized in that the magnesium compound is magnesium diethoxide, the transition metal compound is titanium or zirconium tetrabutoxide and the chlorinated organoaluminium compound is ethylaluminium dichloride or isobutylaluminium dichloride.

10. In a catalytic olefin polymerization, the process comprising contacting said olefin with a catalyst of claim 1 and a cocatalyst comprising an organotmetallic compound of a metal selected from the group consisting of Groups 1, 2, 13 and 14 of the Periodic Table.

11. The polymerization process of claim 10, wherein the olefin is ethylene and wherein the cocatalyst is a trialkylaluminum, wherein the alkyl is straight chain and contains from 2 to 8 carbon atoms.

* * * * *